Figure 2:
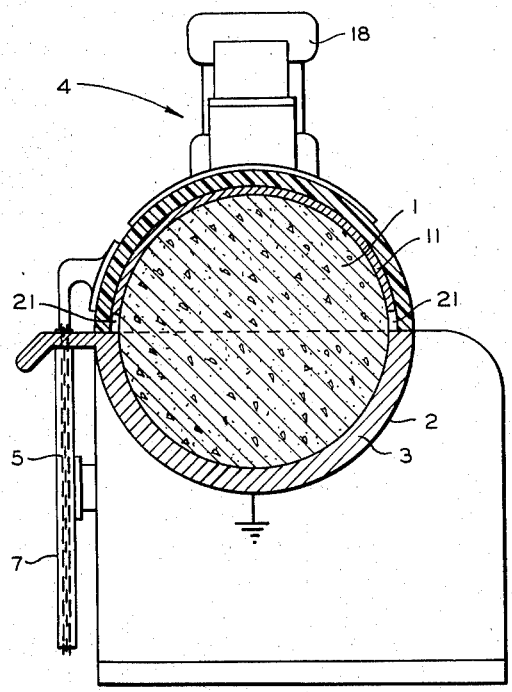

July 7, 1959
R. G. PIETY
2,894,201
CORE LOGGING METHOD AND APPARATUS
Filed Aug. 27, 1954
3 Sheets-Sheet 1
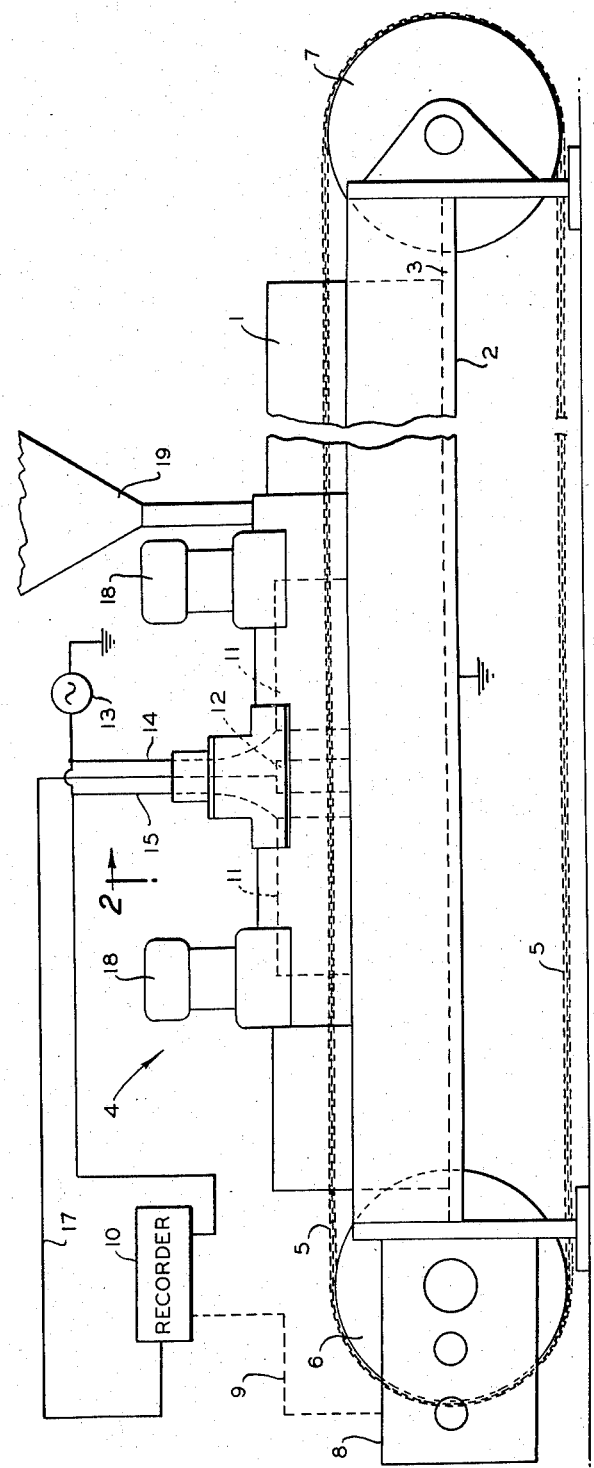
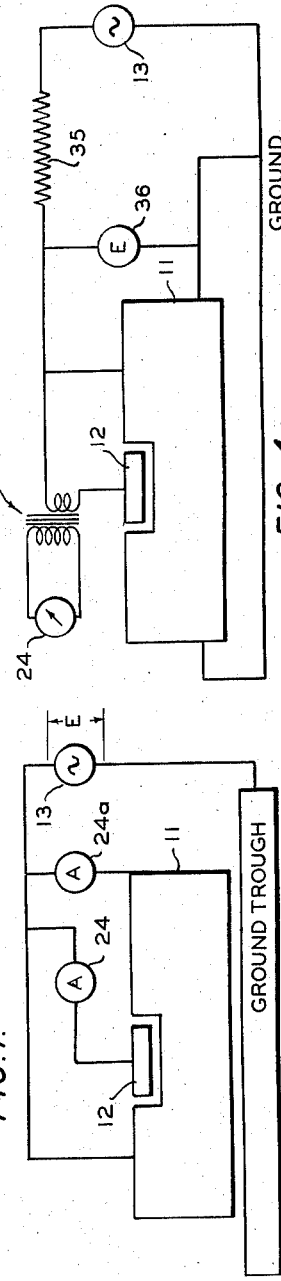
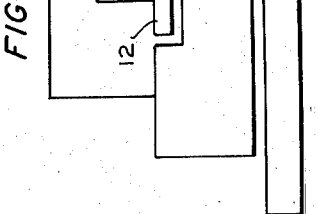
INVENTOR.
R. G. PIETY
BY Hudson + Young
ATTORNEYS July 7, 1959  R. G. PIETY  2,894,201
CORE LOGGING METHOD AND APPARATUS
Filed Aug. 27, 1954  3 Sheets-Sheet 2

INVENTOR.
R. G. PIETY
BY *Hudson & Young*
ATTORNEYS

July 7, 1959

R. G. PIETY 2,894,201

CORE LOGGING METHOD AND APPARATUS

Filed Aug. 27, 1954

3 Sheets-Sheet 3

INVENTOR.
R.G. PIETY
BY *Hudson & Young*

ATTORNEYS

United States Patent Office 2,894,201
Patented July 7, 1959

2,894,201

CORE LOGGING METHOD AND APPARATUS

Raymond G. Piety, Bartlesville, Okla., assignor to Phillips Petroleum Company, a corporation of Delaware Application August 27, 1954, Serial No. 452,518

14 Claims. (Cl. 324—13)

This invention relates to an apparatus and method for making an electrical log on a core removed from a drill hole.

In drilling for minerals or oil it is desirable to obtain information which will identify the geological strata penetrated by the drill hole. Among other methods developed to accomplish this purpose are methods of electrical well logging. Electrical well logging of bore or drill holes is carried out by various types of devices in which two or more electrodes are lowered into the well hole for the purpose of determining certain physical properties associated with the different formations surrounding the well hole. In my U.S. Patent 2,347,794, dated May 2, 1944, I have described and claimed a novel apparatus and method of such well logging.

It is often desirable to make certain chemical and physical analysis on the strata itself. In such cases, a core, or section of the strata, is removed by the use of core drilling tools, such as a diamond core drilling apparatus, for further examination. By utilizing such analytical data in conjunction with a well logging chart, such information is obtained useful in interpreting the well logging chart. If an electric log is run on the core itself, the correlation of this data is greatly simplified. The use of such data has made it possible to study the earth's strata surrounding the well hole by simple well logging and makes it unnecessary, in many cases, to resort to the more expensive core drilling. My invention is particularly useful in obtaining these correlating data.

An object of this invention is to provide improvement in apparatus for electrical logging of drill cores.

Another object of this invention is to provide improved methods of electrically logging a drill core.

Other objects and advantages will be apparent from the detailed description and from the accompanying drawings and the claims.

Figure 3:
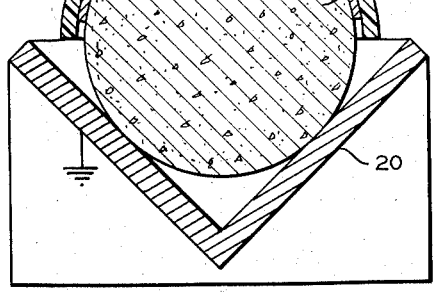

According to the present invention a core removed from a drill hole by means of a diamond core bit or the like is placed in a grounded conducting trough. Provision is made for coating said core with mud if so desired. A guarded electrode assembly is provided for passing a current through said core to said conducting surface. Means are provided for registering the position of said guarded electrode and for measuring and recording the voltage or currents across the guarded and unguarded sections. This invention provides a method of measurement which does not require any current to flow along the core. All currents flow in planes transverse to the core axis. If this were not the case then logging would be difficult because the cores are broken transversely at intervals which are sometimes only a few inches apart. My invention will be further described by referring to the attached drawings of which:

Figure 1 is a side elevation view of an embodiment of my invention wherein the guarded electrode or exploring electrode is moved along the length of the core being logged, Figure 2 is an end view of the apparatus of my invention taken along the section 2—2 of Figure 1, Figure 3 is an end view of an embodiment of the apparatus of my invention adapted to receive cores of various diameters, Figure 4 is a schematic illustration of the circuit of my invention, wherein a constant voltage is applied, Figure 4a is a schematic illustration of the circuit of my invention wherein constant current is utilized.

Figure 5:
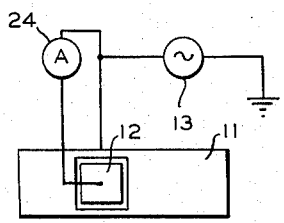
Figure 6:
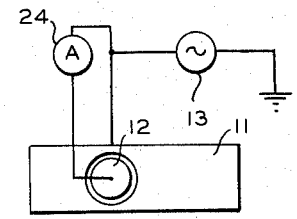
Figure 7:
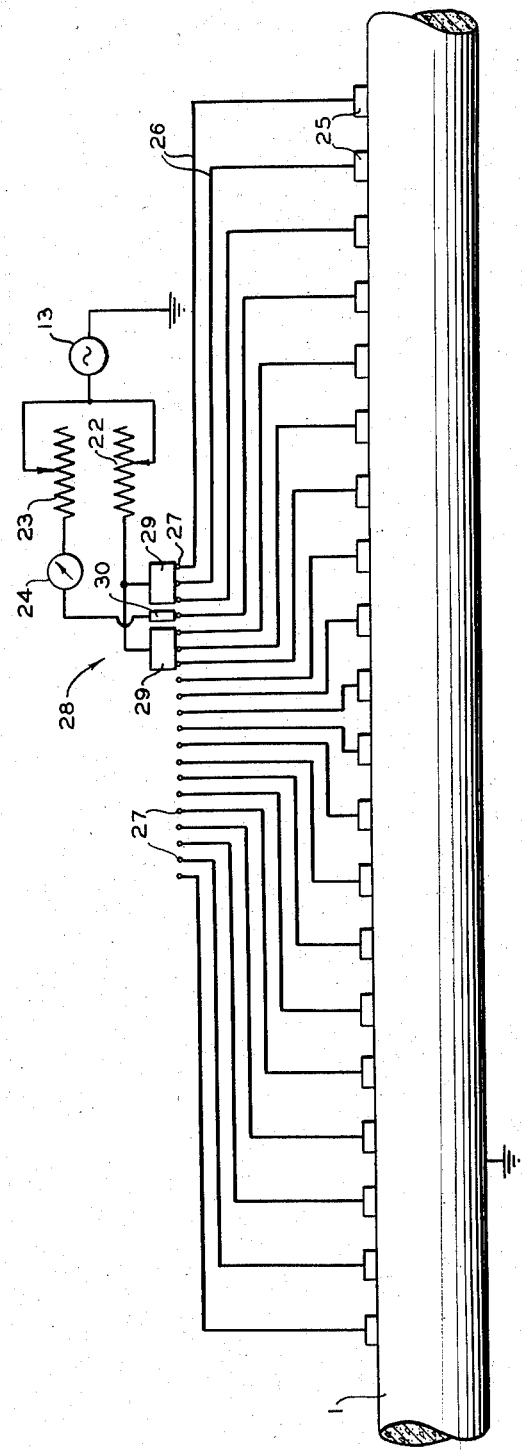

Figures 5, 6 and 7 show various electrodes useful in the practice of my invention.

Figure 8:
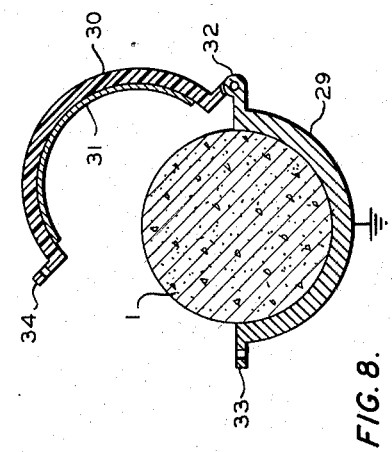

Figures 7 and 8 hereinafter described, disclose another apparatus suitable for the practice of the method of my invention. This apparatus is further described and claimed in copending application of Joe D. Owen having Serial Number 458,457, filed September 27, 1954.

Referring to Figure 1, core 1 is placed in a trough or bed 2 which is lined with a grounded conducting material 3. The guarded electrode assembly 4 fits over the core and is designed so as to engage and move with chain 5. Chain 5 rotates around wheels 6 and 7, these wheels rotating with the chain movement. Wheel 6 is operably mounted in gear box 8 which is in turn connected by mechanical linkage 9 to recorder 10 so that the recorder chart moves with assembly 4 and thereby indicates the position of assembly 4 as it moves along the length of core 1.

The guarded electrode assembly 4 is comprised of guard electrodes 11 and guarded or exploring electrode 12. A potential from source 13 is applied to electrodes 11 via conductors 14 and 15. Current flows between electrodes 11 and grounded surface 3 through core 1. At the same time a potential from source 13 passing through the input circuit of recorder 10 and conduit 17 is applied to electrode 12. Current passes between electrode 12 and grounded surface 3 through the core. This current is recorded by recorder 10 and registered against the position of the electrode. The electric potential from electrodes 11 sets up a field on both sides of the current path from electrode 12 and thus acts to concentrate the current from electrode 12 in a narrow path. Therefore the current flowing from electrode 12 will be dependent only upon the conductivity of the core directly under the electrode and variations in current flow as recorded by recorder 10 will depend only on variation in conductivity of the core as electrode 12 passes along the core length.

Handles 18 are provided to move the assembly. It is, of course, within the scope of the invention to apply power to one of the wheels and cause the chain to move the assembly instead of having the assembly move the chain and wheels as shown. Mud hopper 19 is provided to coat the core with mud ahead of the moving assembly if so desired. In many drilling operations, a mud is used as a cooling and drilling aid. This mud will have an electrical resistance characteristic depending upon its composition. When logging a well, the log will be influenced by the mud coating and degree of penetration. Therefore, it is desirable to treat the core with mud prior to logging.

The drilling mud also has the additional advantage in my logging system. First, it aids in making electrical contact between the electrodes and the core and secondly, it serves as a lubricant as the electrodes move along the axis of the core.

Referring to Figure 2, a sectional view is shown of the apparatus of Figure 1. Like reference numerals are used for like parts. This view shows how the electrodes 11 fit over core 1. In this embodiment of my invention, the trough 2 is designed to take a given size core which fits the general container of the trough.

Referring to Figure 3, the grounded trough 20 is V shaped so as to accommodate cores of different diameters. While the assembly 4 can also be V shaped, better contact and current characteristics can be obtained if this assembly is designed to fit the upper surface of the core 1.

It should be noted that in both the embodiment of Figure 2 and Figure 3 that the electrode should not contact the grounded trough. This is shown by the insulated spaces 21 of Figure 2.

Referring to Figure 4 which is a schematic wiring diagram for my guarded electrode assembly 4, the guard electrodes 11 are considerably longer than is exploring electrode 12. Each guard electrode should be at least three times as long as electrode 12 for best results and longer electrodes are preferred. By having the guard electrode covering several segments as compared to the exploring electrode, the average current flowing from the guard electrode will be comparatively constant since the resistance offered will be the average of the several segments. This insures a fairly constant guard ring or field around the exploring electrode 12. The purpose of this guard ring is to insure radial flow from the exploring electrode through the core. Current flowing through electrode 12 is measured by ammeter 24 which is preferably a recording ammeter of known type. The current flowing through electrode 12 is inversely proportional to the resistance of the core directly beneath the electrode and can be conveniently recorded against the position of the electrode along the length of the core. The core is logged by moving the electrode along the core's length and simultaneously recording the position of the electrode and the current flowing through ammeter 24. In Figure 4, the voltage E from source 13 is held constant, then the current as recorded by either ammeter 24 or 24a is proportional to the conductivity of the core under the electrode connected to ammeter 24 or 24a. By taking the reciprocal of this conductivity, we, of course, can measure the resistivity. While it is possible to measure the current at either 24 or 24a, the preferred method is to measure at 24 since its associated electrode covers only a short segment of the core and variation in conductivity will be readily ascertained.

In Figure 4a, a schematic circuit is shown for a constant current source. Alternating current source 13 is fed via resistance 35 which has a resistance of relatively large magnitude to electrodes 11 and 12. Voltmeter 36 measures the potential from the electrodes to ground. Transformer 37 having a low primary impedance is connected to high impedance voltmeter 24 providing a means for measuring a voltage proportional to the current fed to the primary of the transformer 37. This constitutes a scheme for realizing in practice a very low impedance ammeter so that the voltage E will be substantially constant for both the guard and guarded electrode. It is obvious that if the resistance 35 is very large, then the total current is substantially constant regardless of core variations. Also E is proportional to the average resistivity of the core under the guard electrode. Also, the low impedance of the primary transformer 37 would make the E.M.F. on the whole core under the electrode assembly constant and the ratio of the voltage as determined by 36 to the current as determined by 24 gives the resistivity of the guarded section and the reciprocal of this value is the conductivity. Other arrangements of electrodes are shown in Figure 5, 6 and 7, however many other arrangements can be used. Also in Figures 5 and 6, the guard electrode 11 completely surrounds the exploring electrode 12. In Figure 5 the exploring electrode 42 is square while in Figure 6 it is round. Other shapes and arrangements can be made without departing from the scope of this invention. For example, a plurality of exploring electrodes arranged in a line around the core can be inserted intermediate the ends of the guard electrode.

Referring to Figure 7 which schematically shows an embodiment of this invention wherein a plurality of electrodes or conductors are closed over the core thereby providing more positive contact. The plurality of conductors 25 are uniformly spaced along the core. This can be accomplished by placing the core in the grounded trough and closing a lid containing the plurality of electrodes over the core as is shown in Figure 8 below. Each electrode 25 is connected to an associated contact point 27 via means of conductor 26. By the use of a switching arrangement such as 28 a plurality of electrodes on both sides of any one electrode can be joined to a common potential source by means of contactors 29 which are in turn operably connected to source 13 through variable resistance 22. The center electrode connected to contactor 30 then becomes the exploring electrode. This contactor 30 is connected through ammeter 24 and variable resistance 23 to source 13. As the switching assembly 28 moves along the contact points 27, each electrode 25, in turn, becomes the exploring electrode, while the connected electrodes on both sides of the effective exploring electrode act as an elongated guard electrode. The contact points 27 will generally be arranged in a circle but are shown in a straight line for simplicity. The current flowing through the ammeter 24 and contactor 30 is derived from source 13 and passed through variable resistance 23. The potential applied to contactor 29 is derived from source 13 and passes through variable resistance 22. The resistance 23 is adjusted to a low value so that changes in the quantity of current flowing between contactor 30 and ground are dependent largely upon the resistance of the core between ground and contactor 30. The resistance 22 is adjusted to a high value such that the current flowing between the contactor 29 and ground is substantially constant. The source of potential 13 is of such magnitude that under average operating conditions for any given core the magnitude of the potentials of the exploring and guard electrodes will be substantially equal. Since the potentials of the electrodes are substantially equal the net effect with regard to the distribution of current through the core is the same as if a single elongated electrode was used. This arrangement results in indication from the exploring electrode which is representative of the nature of the core formation immediately below the exploring electrode and between this electrode and ground.

Referring to Figure 8, the core to be logged is placed in grounded trough 29 which is adapted to fit the core. Lid 30 containing a plurality of closely spaced electrodes 31 is pivotably mounted to the trough 29 by means of pivot 32. The lid 30 is clamped over the core by means of lips 33 and 34 which bring the electrodes 31 in close contact with the core. The core can be mud washed prior to closing the lid if so desired or provisions made for forcing mud through the trough after closing. Each electrode will be connected to contact points and switching arrangement as shown in Figure 8. Each electrode is preferably ¼ to 1 inch in width thus providing for a relatively narrow band for each position of the exploring electrode.

I have illustrated my invention in some of its preferred embodiments. Those skilled in the art will see many modifications which can be made without departing from the scope of this invention. For example, I have shown my current source as alternating current while those skilled in the art will readily recognize that a direct current could be used.

I claim:

1. A method of electrically logging a drill core which comprises passing a current through an elongated section of said core, passing a second current through a short section of said core intermediate the ends of said elongated sections, maintaining substantially constant current through said two sections, simultaneously and progressively changing the positions of the two said sections relative to said core and in fixed relation one to the other, and measuring the voltage drops across one of said sections.

2. A method of electrically logging a drill core which comprises placing said core on a conducting surface, contacting said core with an elongated electrode, setting up an electrical potential between said electrode and said conducting surface whereby current flows between said electrode and said surface, contacting the said core with an exploring electrode intermediate the ends of said elongated electrode and being electrically insulated therefrom; setting up an electrical potential between said exploring electrode and said conducting surface whereby current flows between said exploring electrode and said conducting surface; simultaneously moving the elongated electrode and the exploring electrode in fixed relation one to the other along said core, and simultaneously measuring the current flowing between said exploring electrode and said conducting surface as the electrode moves along said core.

3. A method of electrically logging a drill core comprising supporting said core horizontally on a grounded conducting surface, contacting the surface of said core remote from the supported surface with an elongated electrode, setting up an electrical potential between said elongated electrode and said grounded surface whereby electric current flows between the elongated electrode and said surface, maintaining the said current flow at substantially constant value, contacting the said core with an exploring electrode intermediate the ends of said elongated electrode and being electrically insulated therefrom; simultaneously setting up an electrical potential between the exploring electrode and said surface, simultaneously moving the elongated electrode and the exploring electrode in fixed relation thereto along said core, and simultaneously measuring the current flowing between said exploring electrode and said conducting surface as the electrodes move along said core.

4. The method of claim 3 wherein the said core is coated with a mud slurry prior to moving said electrodes along said core.

5. A method of electrically logging a drill core comprising supporting said core on a conducting surface, contacting the surface of said core remote from its supported surface with an elongated electrode, contacting said core at a position intermediate the ends of the elongated electrode with an exploring electrode insulated from said elongated electrode, simultaneously setting up an electrical potential between the elongated electrode and said conduced surface and between the exploring electrode and said conducting surface whereby current flows from said electrodes to said conducting surface, simultaneously moving the elongated electrode and the exploring electrode in fixed relation thereto along the core, and simultaneously measuring the current flowing between the exploring electrode and conducting surface and the position of said electrode on said core.

6. A method of electrically logging a drill core comprising supporting horizontally said core on a conducting surface, coating said core with a mud slurry, contacting resulting coated core with an elongated electrode on its surface remote from the supported surface, contacting said coated core at a position intermediate the ends of said elongated electrode with an exploring electrode insulated from said elongated electrode, setting up a substantially constant flow of electric current between the elongated electrode and the conducting surface, simultaneously setting up a flow of electric current between the exploring electrode and the conducting surface of substantially same current density and direction as the current flow between the elongated electrode and the conducting surface, simultaneously moving the elongated electrode and the exploring electrode in fixed relation thereto along the core, and simultaneously measuring the current flowing between the exploring electrode and the conducting surface and the position of the exploring electrode along the core.

7. An apparatus for electrically logging a drill core comprising in combination a trough having a conducting surface for supporting a drill core, an elongated electrode adapted to contact the upper surface of the core to be logged, means positioning an exploring electrode intermediate the ends of said elongated electrode in fixed relation to said elongated electrode and insulated therefrom so that said elongated electrode and said exploring electrode are adapted to move in fixed relationship one to the other along the upper surface of said core, means for applying a potential between said exploring electrode and said conducting surface, means for applying a potential between said elongated electrode and said conducting surface, and means for measuring current flowing between said exploring electrode and said conducting surface.

8. Apparatus for electrically logging a drill core comprising a trough having a conducting surface to support a drill core; an electrode assembly comprising a guard electrode shaped to contact the surface of the core, said guard electrode having an opening therein intermediate its ends, an exploring electrode shaped to contact the surface of the core, and means positioning said exploring electrode in said opening so as to be electrically insulated from said guard electrode, said guard electrode extending at least three times the length of said exploring electrode on each side of said exploring electrode; a current source connected between said exploring electrode and said conducting surface; a current source connected between said guard electrode and said conducting surface; and means to measure current through said exploring electrode.

9. The apparatus of claim 8 wherein said trough is V shaped.

10. The apparatus of claim 8 wherein said trough is shaped to fit the contour of the supported surface of said core being logged.

11. The combination in accordance with claim 8 further comprising means to move said assembly longitudinally of said trough, and means to measure the position of said assembly relative to said trough as a function of the current through said exploring electrode.

12. The combination in accordance with claim 8 further comprising means secured to said electrode assembly to apply a slurry of mud to the core to be logged.

13. A method of electrically logging a drill core which comprises supporting the core to be logged on a conducting surface, applying a first potential across a relatively short section of said core from its upper surface to the supported surface so that current flows through said short section, applying a second potential which is equal to said first potential across a relatively long section of said core from its upper surface to the supported surface in a fixed relationship on each side of said relatively short section so that current flows through said long section, applying said first and second potentials successively along said core, and simultaneously measuring the current through said short section and the position of said short section on said core.

14. The method of electrically logging a drill core which comprises applying a first potential across an elongated section of the core, applying a second potential which is substantially equal to said first potential across a short section of said core which is intermediate the ends of said elongated section, applying said first and second potentials successively along said core, and measuring the current flow through the resulting short sections of said core.

References Cited in the file of this patent

UNITED STATES PATENTS

| | | |
|---|---|---|
| 2,094,234 | Drain | Sept. 28, 1937 |
| 2,347,794 | Piety | May 2, 1944 |
| 2,501,676 | Ives | Mar. 28, 1950 |
| 2,608,604 | Hart | Aug. 26, 1952 |
| 2,613,250 | Bilhartz et al. | Oct. 7, 1952 |
| 2,615,077 | Tinker | Oct. 21, 1952 |
| 2,704,347 | Doll | Mar. 15, 1955 |